United States Patent [19]
Kanno et al.

[11] Patent Number: 6,153,698
[45] Date of Patent: Nov. 28, 2000

[54] STYRENE-BASED RESIN COMPOSITIONS AND MOLDED ARTICLES THEREOF

[75] Inventors: Tatsuya Kanno, Himeji; Shigeyuki Yoshida, Ootake; Takashi Arai; Yoshiaki Yamaguchi, both of Himeji, all of Japan

[73] Assignee: Daicel Chemical Industries, Ltd., Sakai, Japan

[21] Appl. No.: 09/100,498

[22] Filed: Jun. 19, 1998

[30] Foreign Application Priority Data

Jun. 19, 1997 [JP] Japan .................................. 9-180796

[51] Int. Cl.⁷ .............................. C08F 8/00; C08L 47/00; C08L 83/00
[52] U.S. Cl. ........................................... 525/125; 525/106
[58] Field of Search ..................... 525/106, 105

[56] References Cited

U.S. PATENT DOCUMENTS 5,438,097   8/1995   Liles et al. ................................. 525/63

Primary Examiner—Patrick D. Niland
Attorney, Agent, or Firm—Hickman Coleman & Hughes, LLP

[57] ABSTRACT

A modified styrene-based resin composition in which silicone powder is added to styrene-based resin.

One can obtain styrene-based resin compositions remarkably improved in impact resistance and sliding properties, particularly in permanence during sliding. In particular, when the base material is transparent polystyrene-based resin, it was found that the present invention can provide styrene-based resin compositions having excellent impact strength, sliding properties, and transparency without spoiling their fluidity and thermostability. In addition, use of rubber modified polystyrene as styrene-based resin permits styrene-based resin compositions exhibiting well-balanced impact resistance, sliding properties, heat distortion resistance, molding properties, workability, and surface appearance of molded articles. Thus, the present invention enables general-purpose styrene-based rigid thermoplastics to be used for various applications, that is, it allows improvement of such thermoplastics particularly in adaptability to injection molding, extrusion molding and the like, and thereby will contributes to extension of the range of their application.

24 Claims, No Drawings

STYRENE-BASED RESIN COMPOSITIONS AND MOLDED ARTICLES THEREOF

This patent application claims priority under 35 U.S.C. § 119 from Japanese Patent Application Serial No.JP 9-180796, filed Jun. 19, 1997, which is incorporated herein by reference for all purposes.

DETAILED DESCRIPTION OF THE INVENTION

1. Field of the Invention

The present invention relates to modification techniques for styrene-based resins generally used for various purpose, for example, in wrapping materials, electrical or electronic equipment, sliding components such as gear or bearing, and the like. In particular, it relates to styrene-based resin compositions which have acceptable molding properties and rigidity concomitant with high impact strength, and which exhibit excellent sliding properties by virtue of additives used therein.

2. Description of the Prior Art

In recent years, plastics are widely used in various fields, for example, in hubs of VTR tape reels, housings of printers, television sets, stereos and the like, or chassis, video and audio cassettes, or in electrical or electronic equipment, for example, as inner boxes of refrigerators, or various sliding components such as gears or bearings, or as wrapping materials such as those for food packaging, OPS, or blown films. In particular, general-purpose mass-produced styrene-based resins such as polystyrene (GPPS) have excellent surface appearance, particularly surface gloss, rigidity, and thermostability, and therefore widely used in electrical or electronic equipment, or for wrapping, as described above. The impact strength of such resins is, however, at the lowest level of rigid thermoplastics, and therefore various efforts have been made for a long time to provide them with high impact strength concomitant with high rigidity. In particular, it is highly desired in recent years to maintain all of thermostability, molding properties, and impact resistance at high levels, in order to facilitate the substitution of such resins for expensive engineering plastics, and for save-energy during molding process.

It has been known that increase in average molecular weight improves flexural strength of styrene-based polymer, but it concomitantly deteriorates the molding properties. Addition of plasticizing agents such as mineral oil for improving molding properties decreases rigidity and thermostability of the resin. Furthermore, such plasticizing agents often form deposits around the exhaust ports of metal molds, and thereby causes disfigurement of the metal molds. Such deposit will then transfer or adhere to the surface of product as a flaw and seriously impairs the value of the product.

As a method for widening molecular weight distribution of resin to improve the fluidity while maintaining thermostability and rigidity of the resin at acceptable levels, the Japanese Patent Publication No. S57-30843 B (1982) discloses a process in which low-molecular weight resins are blended with high-molecular weight resins, and the Japanese Patent Publication No. S62-61231 B (1987) discloses a process employing multistage polymerization to obtain resin compositions having a wide molecular weight distribution. The latter method, however, not only increases production cost due to the complexity of the process but also has a drawback that it cannot provide an adequate level of impact strength for the product. Furthermore, the Japanese Patent Publication Nos. S48-45590 A (1973) and H2-170806 A (1990) disclose methods for widening molecular weight distribution of resin by using compounds having multiple vinyl groups in the polymerization reaction. The resin compositions obtained by these method, however, have a drawback that they exhibit poor fluidity.

Rubber modified styrene-based resins such as high-impact polystyrene (HIPS) are also widely used as materials for various molded articles by virtue of their excellent impact resistance, molding properties, workability, and surface gloss. Rubber modified styrene-based resin consists of styrene-based resin matrix in which rubbery polymer is dispersed as fine particles to improve impact resistance. Impact resistance of such rubber modified styrene-based resins (hereinafter sometimes simply referred to as "rubber modified resins") may be further increased by (1) increasing the content of rubbery polymer included in the rubber modified resin, (2) increasing the diameter of rubber particles constituting the disperse phase in the rubber modified resin to the extent that the impact strength increases, or (3) increasing the molecular weight of polystyrene constituting the matrix phase in the rubber modified resin. Although the method described in the above item (1) improves impact strength, it exhibits poor handing properties and increases production cost due to the increased amount of rubbery polymer. In addition, the increased number of rubber particles deteriorates rigidity and surface appearance of the molded articles. Similarly, an increased diameter of rubber particles, as in the method of the above item (2), leads to unacceptable defect in surface appearance of molded products. The method of the above item (3) markedly decreases the fluidity of resin and thereby deteriorates the molding properties and workability.

The Japanese Patent Publication Nos. S57-170949 A (1982) and H7-179692 (1995) disclose another method for improving impact strength by adding organopolysiloxane to styrene-based resin. In this method, however, such additives cannot be added in sufficient amount to obtain an adequate impact strength, in the light of the balance with molding properties, workability, and surface appearance of molded products. Furthermore, addition of organopolysiloxane poorly improves surface impact strength such as that measured by drop-weight impact test. Similarly, in a method employing graft-polymeric silicone rubber as an impact modifier (the Japanese Patent Publication No. S60-252613 A (1985)) or a method for modifying polystyrene using silicone rubber powder (the Japanese Patent Publication No. H8-67817 A (1996)), addition of such additives in sufficiently small amount not to impair the other properties of the resin does not improve impact resistance, and an increased amount of such additives will spoil surface appearance of the product.

Although polyamides, polyacetals, and glass-reinforced styrene-based resin having high mechanical strength have been mainly used in electrical or electronic equipment and sliding components, rubber modified styrene-based resins containing silicone oil such as dimethyl silicone for improvement of sliding properties, glossiness, impact resistance, and molding properties are also coming into use for such purpose.

Although rubber modified styrene-based resin compositions containing silicone oil have excellent initial sliding properties, they exhibit low permanence and often cause various troubles in molding process. In addition, since silicone oil is an electrically-conductive material, vaporization of oligomer components included in silicone oil may cause troubles resulted from electrical leak such as those with switches. In order to provide sufficient sliding properties for the above-described purposes, silicone oil should usually be included in resin composition in an amount of more than 2% by weight. In the long term, however, silicone oil separates from the resin composition, since the compatibility between silicone oil and rubber modified styrene-based resin composition is essentially low. Thus, the sliding properties deteriorate with time. Furthermore, since the silicone oil simply adhere to the surface of molded resin, cleaning of the molded resin with solvents will remove the silicone oil, resulting in total loss of sliding properties. In the short term, increase in amount of silicone oil added to the resin composition will promote separation of the silicone oil from the rubber modified styrene-based resin composition, resulting in disfigurement of the molded article such as scorching due to pollution of metal mold surface with silicone oil.

As a way of addressing such problems, several methods characterized by the use of highly viscous silicone oils are disclosed. For example, the Japanese Patent Publication No. H1-294764 A (1989) describes a resin composition in which dimethyl silicone oil having a viscosity of 5,000–15,000 cSt at 25° C. is added to rubber modified styrene-based resin. As another example, the Japanese Patent Publication No. H2-49049 A (1990) describes a resin composition in which a mixture of dimethyl silicone oil having a viscosity of 5,000–15,000 cSt at 25° C. and high-molecular weight polydimethylsiloxane having a number-average molecular weight of 200,000–800,000 is added to rubber modified styrene-based resin. These methods, however, don't solve the essential problem that silicone oil is prone to separate from rubber modified styrene-based composition.

The Japanese Patent Publication No. H1-308446 A (1989) describes a process in which a combination of dimethyl silicone oil having a viscosity of 5,000–15,000 cSt at 25 ° C. and a styrene-dimethylsiloxane block copolymer having a number-average molecular weight above 50,000 and containing 20–80% by weight styrene is used in order to improve the compatibility between silicone oil and rubber modified styrene-based resin composition. The process, however, has a critical drawback that manufacture of such block copolymers is considerably difficult and requires high cost because such copolymers are obtained by anion polymerization. In addition, the improvement of compatibility is not enough to solve the problem of phase separation in the long term. Thus, the conventional methods have drawbacks that separation of silicone oil from rubber modified styrene-based resin composition deteriorates sliding properties of the composition, particularly its permanence, and thereby restricts the application of such compositions.

PROBLEMS TO BE SOLVED BY THE INVENTION

As described above, it has hitherto been quite difficult to improve impact strength and sliding properties of styrene-based resin while controllably maintaining its advantageous properties such as molding properties and rigidity.

The present inventors have concentrated their efforts on solving such difficulties, and finally found that addition of silicone powder, particularly use of a combination of silicone powder and rubber modified styrene-based resin, produces a good result, and that impact resistance and sliding properties, particularly its permanence during sliding, of the composition can be further improved by specifying the amount and particle diameter of dispersed rubber in the rubber modified resin. The present invention has been completed on the basis of such finding.

Means for Solving the Problems

The present inventors have found that a styrene-based resin, particularly a styrene-based resin composition in which a specified amount of specified silicone powder is added to a rubber modified polystyrene containing rubber having a specified particle diameter can solve the above problems. The present invention has been completed on the basis of this finding.

The present invention thus provides:

(1) a modified styrene-based resin composition in which silicone powder is added to styrene-based resin;

(2) a styrene-based resin composition of the above item (1) in which 0.0001–5 parts by weight of silicone powder is blended with 100 parts by weight of styrene-based resin;

(3) a styrene-based resin composition of the above item (1) or (2) in which the silicone powder has a composite structure consisting of silicone rubber fine particles of which surface is coated with silicone resin;

(4) a styrene-based resin composition of any one of the above items (1)–(3) in which the silicone powder has a volume-average particle diameter of 0.1–25 $\mu$m;

(5) a styrene-based resin composition of any one of the above items (1)–(4) in which the silicone powder is a silicone rubber powder primarily consisting of an addition polymer of vinyl-containing organopolysiloxane and organohydrogen polysiloxane;

(6) a styrene-based resin composition of the above item (5) in which the silicone powder is a silicone rubber powder primarily consisting of an addition polymer of vinyl-containing dimethyl polysiloxane and methyl hydrogen polysiloxane;

(7) a styrene-based resin composition of any one of the above items (1)–(6) characterized in that the siloxane backbone chain in the silicone powder is cross-linked in the form of three-dimensional network;

(8) a styrene-based resin composition of any one of the above items (1)–(7) in which the silicone powder is a silicone rubber powder set forth in the above item (5) or (6) of which particle surface is coated with polydimethylsilsesquioxane;

(9) a styrene-based resin composition of any one of the above items (1)–(8) characterized in that the styrene-based resin is transparent;

(10) a styrene-based resin composition of any one of (1)–(9) in which the styrene-based resin is polystyrene having a weight-average molecular weight of $10 \times 10^4$–$60 \times 10^4$;

(11) a styrene-based resin composition of any one of the above items (1)–(10) characterized in that the styrene-based resin is rubber modified polystyrene;

(12) a styrene-based resin composition of any one of the above items (1)–(11) characterized in that the rubber modified styrene-based resin is rubber modified polystyrene which contains 1–30% by weight dispersed rubber particles having a volume-average particle diameter of 0.01–5 $\mu$m;

(13) a styrene-based resin composition of any one of the above items (1)–(12) characterized in that it has a dynamic coefficient of friction of 0.3–0.4 and a static coefficient of friction of 0.3–0.4 each as measured in conformity with JIS-K7125-1987; and (14) a molded article, particularly an injection-molded or extruded article, produced from a styrene-based resin composition of any one of the above items (1)–(13).

The present invention is further described in detail by the following description.

The styrene-based resins used in the present compositions may be obtained by polymerizing the following monomers. Styrene-based monomers constituting the styrene-based resin include styrene, alkyl-substituted styrenes (e.g. o-methylstyrene, p-methylstyrene, m-methylstyrene, 2,4-dimethylstyrene, p-ethylstyrene, p-t-butylstyrene), (-alkyl-substituted styrenes (e. g. (-methylstyrene, (-methyl-p-methylstyrene), and halogenated styrenes (e.g. o-chlorostyrene, p-chlorostyrene). Preferred styrene-based monomers are styrene, o-methylstyrene, and p-methylstyrene, and styrene being particularly preferred. These styrene-based monomers may be each used alone, or in combination with one or more other such monomers.

It is particularly preferred that the styrene-based resin is polystyrene having a weight-average molecular weight of $10 \times 10^4$–$60 \times 10^4$.

The styrene-based monomers may be copolymerized, as necessary, with copolymerizable monomers such as acrylic or methacrylic acids (e.g. acrylic acid, methacrylic acid), acrylic or methacrylic acid esters (e.g. methyl methacrylate, ethyl acrylate, butyl acrylate), maleic anhydride, or acrylonitrile.

Among the above styrene-based monomers, those transparent may be selected as appropriate for the styrene-based resin composition of the present invention. Furthermore, such transparent styrene-based monomers may be copolymerized, as necessary, with copolymerizable monomers such as acrylic or methacrylic acids (e.g. acrylic acid, methacrylic acid), acrylic or methacrylic acid esters (e.g. methyl methacrylate, ethyl acrylate, butyl acrylate), maleic anhydride, or acrylonitrile, in an amount which does not spoil the transparency.

These resins may be produced by any of commonly used polymerization methods, including bulk polymerization, solution polymerization, suspension polymerization, and a combination thereof. For improving productivity, bulk polymerization is particularly preferred.

The styrene-based resins used in the present compositions also include rubber modified styrene-based resin compositions in which particles of flexible material are dispersed in a matrix of styrene-based resin or in the styrene-based resin itself. In the present invention, rubber modified styrene-based resin compositions produced by commonly used polymerization processes may be used. For example, they may be produced by bulk-suspension two-stage polymerization in which rubbery polymer is dissolved in styrene-based resin monomer and bulk polymerization is then conducted followed by suspension polymerization, or by other known processes such as bulk polymerization.

By using rubber modified polystyrene as described above, styrene-based resin compositions having well-balanced impact resistance, heat distortion resistance, molding properties, workability, and surface appearance of molded articles may be obtained.

In polymerization process of the above rubber modified styrene-based resins, molecular weight modifiers such as α-methylstyrene dimer, mercaptans, terpenes, or halogenated compounds, solvents, polymerization initiators, and the like may be included. Solvents may include aromatic hydrocarbons such as toluene, xylene, and ethylbenzene, aliphatic hydrocarbons, dialkyl ketones, and a combination of two or more of such solvents. Such solvents are preferably used in an amount in the range of 0–50% by weight. Solvent more than 50% by weight is economically disadvantageous, since it drastically decreases the polymerization rate, and requires more energy for recovering the solvent.

The polymerization initiators include organic peroxides, for example, ketone peroxides such as cyclohexanone peroxide, 3,3,5-trimethylcyclohexanone peroxide, or methylcyclohexanone peroxide, peroxyketals such as 1,1-bis(t-butylperoxy)cyclohexane, or n-butyl-4,4-bis(t-butylperoxy) valerate, cumene hydroperoxide, diisopropylbenzene peroxide, 2,5-dimethylhexane-2,5-dihydroperoxides, t-butylcumyl peroxide, dialkyl peroxides such as (,('-bis(t-butylperoxy-m-isopropyl)benzene, 2,5-dimethyl-2, 5-di(t-butylperoxy-m-isopropyl)benzene, or 2,5-dimethyl-2, 5-di(t-butylperoxy)hexyne-3, diacyl peroxides such as decanoyl peroxide, lauroyl peroxide, benzoyl peroxide, or 2,4-dichlorobenzoyl peroxide, peroxycarbonates such as bis(t-butylcyclohexyl)peroxydicarbonate, or peroxyesters such as t-butyl peroxybenzoate, or 2,5-dimethyl-2,5-di (benzoylperoxy)hexane, and azo compounds such as 2,2-azobis(2-methylbutyronitrile), or 1,1'-azobis(cyclohexane-1-carbonitrile). These initiators may be each used alone, or in combination with one or more other such initiators.

In the above bulk polymerization, it is preferred to effectively stir the reaction until the rate of polymerization reaches about 30% by weight, and thereafter the stirring is preferably suppressed.

The rubbery polymers used in production of the above rubber modified styrene-based resin may be any of standard rubbery polymers such as polybutadiene, styrene-butadiene copolymers, polyisoprene, butadiene-isoprene copolymers, and ethylene-propylene copolymers. These rubbery polymers may be each used alone, or in combination with one or more other such polymers.

Suitably, butadiene polymer or styrene-butadiene copolymer is used as such rubbery polymer, preferably in a polymerization solvent such as benzene, toluene, hexane, heptane, or the like. Butadiene polymers used in the present invention may be high-cis polybutadiene having a high cis content, or low-cis polybutadiene having a low cis content. Styrene-butadiene block copolymer rubbers used in the present invention may be of complete block type or of tapered block type, and they may include, for example, styrene-1,3-butadiene block copolymer rubber in which a part of the styrene repeating units is substituted with copolymerizable monovinyl aromatic hydrocarbon repeating units, or that in which a part of 1,3-butadiene repeating units is substituted with diolefinic repeating units other than 1,3-butadiene, or that in which a part of styrene repeating units and a part of 1,3-butadiene repeating units are each substituted with monovinyl aromatic hydrocarbon repeating units and diolefinic repeating units other than 1,3-butadiene, respectively.

Preferably, the rubber modified styrene-based resin compositions contain 1–30%, more preferably 3–20%, and particularly preferably 3–8% by weight rubber component. At less than 1% by weight, the rubber component does not provide sufficient impact strength, and at more than 30% by weight, it deteriorates rigidity and glossiness, resulting in marked disfigurement.

Preferably, the dispersed rubber particles in rubber modified styrene-based resin have a volume-average particle diameter of 0.01–5 μm, more preferably of 0.1–4 μm. Rubber particles having a volume-average particle diameter below 0.01 μm does not improve surface impact strength, although it retains rigidity. Rubber particles having a volume-average particle diameter above 5 μm spoils the surface appearance such as surface gloss.

As used herein, the term "volume-average particle diameter" means a value obtained in the following manner: transmission electron micrograph of a composition is obtained using its ulrathin section, circle-reduced diameters are then measured for 1,000 rubbery polymers, and used in the following equation (1):

Volume-average particle diameter=$(\Sigma n_i Di^4)/(\Sigma n_i Di^3)$ (I)

in which "$n_i$" represents the number of rubbery polymer particles having a circle-reduced particle diameter of Di ($\mu$m).

In the present invention, the dispersed rubbery polymer particles may have a morphologic feature of cell type, or of core-shell type in which core of styrene-based polymer is included in a shell of rubbery polymer, or may also be in the form of latex. Furthermore, the present resin may simultaneously contain both of cell type particles and core-shell type particles at any volume ratio.

Silicone powder which may be used in the present invention includes silicone rubber powder obtained by hardening oily silicone, silicone resin powder, silicone composite powder, and the like. Silicone powder shows little tendency to aggregate, exhibiting high dispersibility, and when added to styrene-based resin, it remarkably improves impact resistance and sliding properties of the composition.

By using the above-mentioned silicone rubber powder which is particularly flexible among silicone powders, it is possible to improve both of impact resistance and sliding properties, such as abrasion resistance, of a styrene-based resin composition obtained by adding such powder.

Since silicone powder takes an embedded form in molded articles, the sliding properties of such articles doesn't change even by cleaning with solvent, and exhibit excellent permanency.

By using silicone resin powder which has little tendency to aggregate and exhibits high dispersibility, it is also possible to improve impact resistance and sliding properties of a styrene-based resin composition obtained by adding such powder. Besides its excellent impact resistance and sliding properties, since the silicone resin powder doesn't melt with heat and resists solvents or petroleum fractions, a styrene-based resin composition obtained by adding such silicone resin powder may also be suitably used in molding at high temperature, particularly in high-speed injection molding, or for an application requiring solvent resistance.

Alternatively, by using silicone composite powder which is flexible and exhibits excellent dispersibility, it is possible to remarkably improve impact resistance and sliding properties of a styrene-based resin composition obtained.

Although composition of silicone rubber powder may be known and described in, for example, the Japanese Patent Publication No. H3-93834 (1991), those obtained by subjecting (a) vinyl-containing organopolysiloxane and (b) organohydrogen polysiloxane to addition reaction followed by hardening are preferred because they are easily available.

Component (a) should contain at least two vinyl groups attached to silicon atom in its single molecule. Although the vinyl groups may present at any position in the molecule, it is preferred that at least the termini of the molecule contain vinyl groups. Besides vinyl groups, organic radicals attached to silicon may include alkyl groups such as methyl, ethyl, propyl, butyl, hexyl, and dodecyl groups, aryl groups such as phenyl group, aralkyl groups such as β-phenylethyl and β-phenylpropyl groups, and monovalent substituted hydrocarbons such as chloromethyl and 3,3,3-trifluoropropyl groups. It is preferred that more than 90 mol % of such organic radicals attached to silicon atom are methyl, because it produces a greater improvement in impact resistance when added to styrene-based resin. Such molecules may be linear or branched, and a combination of both types may also be used.

Examples of Component (a) include Compounds (1)–(3) each represented by the following general formulas:

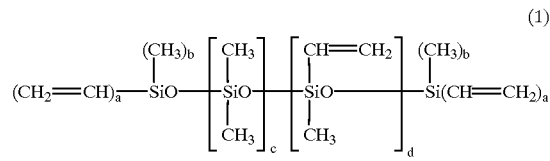

(wherein a and b are each 0 or an integer of 1 to 3, and c and d are each 0 or an integer of 1 or more, with the provisos that a+b=3 and 2a+d≧2;

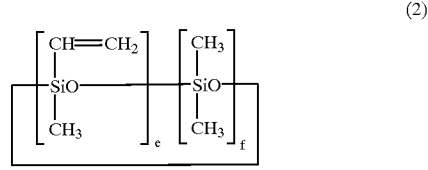

(wherein e is an integer of 2 or more, and f is 0 or an integer of 1 or more, with the proviso that e+f=4–8); and

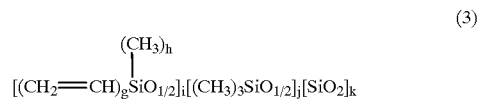

(in Formula (3) which represents an average empirical formula, g is an integer of 1 to 3, h is 0, 1, or 2, and i, j and k are each an integer of 1 or more, with the proviso that g+h=3).

Component (b) should contain at least two hydrogen atoms attached to silicon atom in its single molecule. Component (b) is a cross-linking agent for Component (a), and the hydrogen atoms attached to silicon in Component (b) react with the vinyl groups in Component (a) in addition reaction, resulting in hardening.

Besides hydrogen atoms, organic radicals attached to silicon may include those described regarding Component (a), and a preferable group is methyl because it produces a greater improvement in impact resistance when added to styrene-based resin. The structure of this component is not specifically limited, and may be linear, branched, or cyclic.

Examples of Component (b) include Compounds (4)–(6) each represented by the following general formulas:

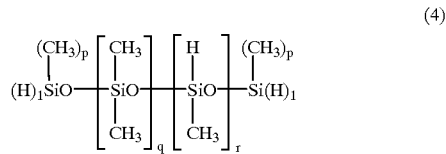

(wherein l is 0 or 1, p is 2 or 3, q is 0 or an integer of 1 or more, and r is an integer of 1 or more, with the provisos that l+p=3 and 2l+r≧3;

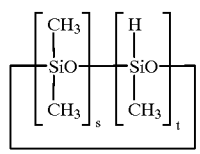

(5)

(wherein s is 0 or an integer of 1 or more, and t is an integer of 3 or more, with the proviso that s+t=4–8);

(6)

(in Formula (6) which represents an average empirical formula, u is an integer of 1 to 3, v is 0, 1, or 2, and w, x and y are each an integer of 1 or more, with the proviso that u+v=3).

These silicone rubber powders may be obtained according to known procedures, for example, by hardening through spray-drying of a raw material solution or by hardening a raw material in an emulsion.

The silicone resin powder has a three-dimensional structures obtained by hydrolysis and condensation of silane, and includes, for example, those described in the Japanese Patent Publication Nos. S60-13813 A (1985) and S-63-77940 A (1988). Among others fine particles of so-called polymethylsilsesquioxane of which siloxane bondings form a cross-linked three-dimensional structure represented by $(CH_0SiO_{3/2})$ are particularly preferred. As described in the following scheme, this compound may be obtained by hydrolysis and condensation of methyltrichlorosilane or methyltrialkoxysilane in water.

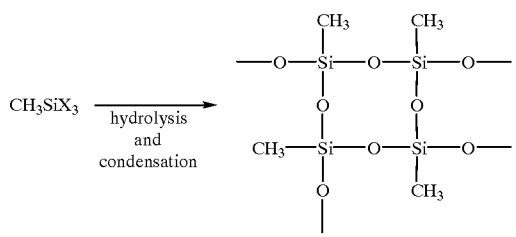

(wherein X represents Cl or an alkoxy group).

Particle diameter of silicone powder was measured by means of a particle counter.

Silicone composite powder is a silicone power which has a composite structure consisting of silicone rubber fine particles of which surface is coated with silicone resin (hereinafter referred to as silicone composite powder).

Preparation methods for silicone composite powder are not specifically limited. For example, it may be prepared by those methods in which spherical silicone rubber powder is obtained by hardening through spray-drying of a stock solution containing an addition polymer of vinyl-containing organopolysiloxane and organohydrogen polysiloxane, preferably vinyl-containing dimethyl polysiloxane and methyl hydrogen polysiloxane, and the particle surface of the powder thus obtained is then coated with polydimethylsilsesquioxane by hydrolyzing and condensing methyltrichlorosilane or methyltrimethoxysilane on the power. Alternatively, it may also be prepared by those methods in which spherical silicone rubber powder is obtained by hardening the above-mentioned stock solution in an aqueous emulsion, and the particle surface of the powder thus obtained is then coated with polydimethylsilsesquioxane.

Silicone powder having a volume-average particle diameter in the range of 0.1–25 $\mu$m, and preferably 0.2–20 $\mu$m, provides a styrene-based resin composition having excellent rigidity and sliding properties without spoiling fluidity and thermostability of the composition. When the volume-average particle diameter is below 0.1 $\mu$m, improvement in impact resistance is not observed, while when the diameter is above 25 $\mu$m, improvement in impact resistance is not observed too, and the surface appearance is spoiled. Diameter of silicone powder particle was measured by means of a particle counter.

The ratio of silicone powder to styrene-based resin in the composition of the present invention is as follows: the amount of silicone powder added to 100 parts by weight of styrene-based resin is preferably 0.0001–5 parts by weight, and more preferably 0.005–3 parts by weight. Silicone powder below 0.0001 part by weight will not produce adequate impact strength and sliding properties. Silicone powder above 5 parts by weight increases production cost, and spoils transparency of the product when transparent styrene resin is used. In the case that improvement in sliding properties is particularly desired, it is preferred to add 0.01–5 parts by weight of silicone powder.

Since silicone powder exhibits quite excellent dispersibility, methods of adding the same are not specifically limited. For example, silicone powder may be suspended in a styrene monomer solution before polymerization, or it may be added between polymerization process and devolatizing process, or after devolatizing process. Alternatively, silicone powder may be dry-blended with styrene resin, and fused and mixed using a single or twin screw extruder. The styrene-based resin composition of the present invention may also contain additives such as lubricant, mold release agent, fire retardant, antioxidant, ultraviolet light absorber, antistatic agent, colorant, or filler as necessary.

The styrene-based resin composition of the present invention may be mixed with additives as necessary and used for various molding. The following describe injection molding and extrusion molding.

Injection-molded articles may be molded according to the usual injection molding technique. For this process, the injection molding temperature is usually selected in the range of 180–280° C. the injection molding pressure is usually selected in the range of 50–140 kg/cm$^2$·G, and the screw revolution speed is usually selected in the range of 50–300 rpm.

Extruded articles may be obtained, for example, by fusing a raw material in an extruder and then extruding it from T-die, or by extruding a raw material in the form of sheet using an extruder followed by biaxial orientation using tenter or inflation method.

Orientation may be monoaxial orientation, sequential biaxial orientation, synchronous biaxial orientation, or biaxial orientation using inflation method. As a typical example, sequential biaxial orientation is described below. For example, a sheet prepared using T-die or calender may be monoaxially (for example longitudinally) stretched 2–5 fold at a temperature of 100–130° C. and then stretched at right angles with the preceding direction (for example transversely) 2–5 fold at a temperature of 100–130° C. Longitudinal stretching is usually conducted using nip rolls, and transverse stretching is usually conducted using a tenter.

Biaxially oriented sheets obtained by such molding techniques may further be treated with heat or corona discharge as necessary. Thickness of such sheet can be regulated as appropriate with slit width, dice diameter, extruder output, blow ratio, take-off speed, and the like. The thickness is usually 10–1000 μm.

The styrene-based resin composition of the present invention thus obtained can be widely used for various products having well balanced rigidity, impact resistance and surface appearance of molded articles without decrease in fluidity, such as IC sticks, blister packs, food containers, and various daily necessaries. The styrene-based resin compositions of the present invention may also contain additives such as lubricant, mold release agent, fire retardant, antioxidant, ultraviolet light absorber, antistatic agent, colorant, or filler as necessary.

The present invention is further illustrated by the following Examples which are not intended to be limiting in any way.

EXAMPLES

In Examples and Reference Examples, the following methods were used for measurements of physical properties.

(1) Mold V notched and unnotched Izod impact strength: Using Model PS40 ESA Injection Molder manufactured by Nissei Plastic Industrial Co., Ltd., prescribed test pieces of 64 mm (1)×12. 7 mm (t)×6.4 mm (b) were injection-molded at a cylinder temperature of 210° C. a mold temperature of 40° C. an injection speed of 3 m/sec, and an injection pressure of 530 kgf/cm, and used in the measurement in conformity with JIS-K7110-1984.

(2) Drop-weight impact strength: Using Model PS40 ESA Injection Molder manufactured by Nissei Plastic Industrial Co., Ltd., flat plates of 50 mm×90 mm×2 mm were injection-molded at a cylinder temperature of 210° C. a mold temperature of 40° C. an injection speed of 3 m/sec, and an injection pressure of 530 kgf/cm, and used in the measurement in conformity with ASTM-D1709.

(3) Tensile strength: Using Model PS40 ESA Injection Molder manufactured by Nissei Plastic Industrial Co., Ltd., JIS No. 1 test pieces were injection-molded at a cylinder temperature of 210° C. a mold temperature of 40° C. an injection speed of 3 m/sec, and an injection pressure of 530 kgf/cm, and used in the measurement in conformity with JIS-K7113-1981.

(4) Flexural strength: Using Model PS40 ESA Injection Molder manufactured by Nissei Plastic Industrial Co., Ltd., test pieces of 135 mm×11 mm×6 mm were injection-molded at a cylinder temperature of 210° C. a mold temperature of 40° C. an injection speed of 3 m/sec, and an injection pressure of 530 kgf/cm, and used in the measurement in conformity with ASTM-D790.

(5) Dynamic coefficient of friction and static coefficient of friction: Using Model PS40 ESA Injection Molder manufactured by Nissei Plastic Industrial Co., Ltd., flat plates of 120mm×120mm×2 mm were injection-molded at a cylinder temperature of 120° C. a mold temperature of 40° C. an injection speed of 3 m/sec, and an injection pressure of 630 kgf/cm, and used in the measurement in conformity with JIS-K7125-1987.

(6) Dynamic coefficient of friction and static coefficient of friction after wiping with solvents: Flat plates similar to those used in (5) were cleaned by wiping 10 times with silk cloth soaked in ethanol, and the dynamic coefficient of friction and the static coefficient of friction after such cleaning were measured in conformity with JIS-K7125-1987.

Examples 1–4

To polystyrene resin (Daicel Chemical Industries, Ltd., Daicel styrol # 53, Mw=320,000), silicone composite powder having a volume-average particle diameter of 5 μm (Shin-Etsu Chemical Co., Ltd., X-52-1139K, average particle diameter 1–20 μm) was added at one of the ratios indicated in Table 1 (to total 100 parts by weight), regranulated using a twin screw extruder (IKEGAI Corporation, Model PCM 30), and then molded using the above-mentioned injection molder into Izod impact strength test pieces, 2 mm-thick flat plates, tensile strength test pieces, and flexural strength test pieces.

Examples 5–8

To polystyrene resin (Daicel Chemical Industries, Ltd., Daicel styrol # 53, Mw=320,000), silicone composite powder having a volume-average particle diameter of 13 μm (Shin-Etsu Chemical Co., Ltd., X-52-1139G, average particle diameter 1–30 μm) was added at one of the ratios indicated in Table 2 (to total 100 parts by weight), regranulated using a twin screw extruder (IKEGAI Corporation, Model PCM 30), and then molded using the above-mentioned injection molder into Izod impact strength test pieces, 2 mm-thick flat plates, tensile strength test pieces, and flexural strength test pieces.

Reference Example 1

Polystyrene resin (Daicel Chemical Industries, Ltd., Daicel styrol # 53, Mw=320,000) was granulated using a twin screw extruder (IKEGAI Corporation, Model PCM 30), and then molded using the above-mentioned injection molder into Izod impact strength test pieces, 2 mm-thick flat plates, tensile strength test pieces, and flexural strength test pieces.

Reference Example 2

To polystyrene resin (Daicel Chemical Industries, Ltd., Daicel styrol # 53, Mw=320,000), silicone oil (Shin-Etsu Silicone Co., Ltd., KF-96 1000CS) was added in an amount of 1.2 parts by weight (to total 100 parts by weight), regranulated using a twin screw extruder (IKEGAI Corporation, Model PCM 30), and then molded using the above-mentioned injection molder into Izod impact strength test pieces, 2 mm-thick flat plates, tensile strength test pieces, and flexural strength test pieces.

The test pieces thus prepared were each subjected to the above-described physical tests. The results are summarized in Table 1,2.

TABLE 1

|  |  |  | Reference | | Example | | | |
| --- | --- | --- | --- | --- | --- | --- | --- | --- |
|  |  |  | 1 | 2 | 1 | 2 | 3 | 4 |
| Additives | Weight of X - 52 - 1139K added | parts by weight | 0 | 0 | 0.1 | 0.01 | 0.005 | 0.001 |
|  | Weight of oil added | parts by weight | — | 1.2 | — | — | — | — |
| Practical physical properties | Haze (2 mm thick) | (%) | 2.0 | 2.5 | 12 | 8 | 6 | 3 |
|  | Flexural modulus | (kg/cm$^2$) | 30,800 | 30,800 | 31,000 | 31,200 | 31,300 | 30,700 |
|  | Tensile strength | (kg/cm$^2$) | 470 | 420 | 470 | 500 | 500 | 490 |
|  | Yield strength | (kg/cm$^2$) | 470 | 420 | 470 | 500 | 500 | 490 |
|  | Breaking strain | (%) | 4 | 4 | 5 | 5 | 5 | 5 |
|  | Dupont impact strength | (kg cm) | 1.19 | 1.2 | 2.5 | 1.8 | 1.8 | 1.5 |
|  | Izod impact strength V notched unnotched | (kgf · cm/cm) | 2 5.60 | 2 5.60 | 3 9.3 | 3 10.0 | 3 9.0 | 3 7.5 |

TABLE 2

|  |  |  | Reference | Example | | | |
| --- | --- | --- | --- | --- | --- | --- | --- |
|  |  |  | 1 | 5 | 6 | 7 | 8 |
| Additives | Weight of X - 52 - 1139G added | parts by | 0 | 0.1 | 0.01 | 0.005 | 0.001 |
| Practical physical properties | Haze (2 mm thick) | (%) | 2.0 | 12 | 8 | 6 | 3 |
|  | Flexural modulus | (kg/cm$^2$) | 30,800 | 30,700 | 31,200 | 30,500 | 30,400 |
|  | Tensile strength | (kg/cm$^2$) | 470 | 490 | 505 | 515 | 520 |
|  | Yield strength | (kg/cm$^2$) | 470 | 490 | 505 | 515 | 520 |
|  | Breaking strain | (%) | 4 | 5 | 5 | 5 | 5 |
|  | Dupont impact strength | (kg cm) | 1.19 | 1.9 | 1.5 | 1.5 | 1.5 |
|  | Izod impact strength V notched unnotched | (kgf · cm cm) | 2 5.60 | 3 14.5 | 3 10.0 | 3 9.0 | 3 7.0 |

The following Examples are those regarding rubber modified polystyrene.

Production of Rubber Modified Styrene-Based Resin (Hereinafter Referred Simply to as HIPS)-1

In continuous bulk polymerization process, styrene-butadiene copolymer was dissolved in styrene, and polymerized with stirring to obtain a rubber modified styrene-based resin (HIPS-1) which contains 8% by weight rubber component and in which the rubbery polymer particles in the disperse phase exhibit a single occlusion structure and have a volume-average particle diameter of 0.2 µm.

Production of HIPS-2

In continuous bulk polymerization process, polybutadiene was dissolved in styrene, and polymerized with stirring to obtain a rubber modified styrene-based resin (HIPS-2) which contains 10% by weight rubber component and in which the rubbery polymer particles in the disperse phase exhibit a cell type and have a volume-average particle diameter of 1.8 µm.

Production of HIPS-3

In continuous bulk polymerization process, styrene-butadiene copolymer and HIPS-2 were dissolved in styrene, and polymerized with stirring to obtain a rubber modified styrene-based resin (HIPS-3) which contains 8% by weight rubber component and in which rubbery polymer particles exhibiting a core shell type with a volume-average particle diameter of 0.2 µm and rubbery polymer particles exhibiting a cell-type with a volume-average particle diameter of 1.8 µm are both present in the disperse phase and the rubbery polymer particles have, in the aggregate, a volume-average particle diameter of 0.5 µm Examples 9–12

To HIPS-1, silicone composite powder having a volume-average particle diameter of 5 µm (Shin-Etsu Chemical Co., Ltd., X-52-1139K) was added at one of the ratios indicated in Table 3, regranulated using a twin screw extruder (IKEGAI Corporation, Model PCM 30), and then molded using the above-mentioned injection molder into Izod impact test pieces and 2 mm-thick flat plates for evaluation. The results of such evaluation are shown in Table 3.

Example 13

To HIPS-1, silicone composite powder having a volume-average particle diameter of 13 µm (Shin-Etsu Chemical Co., Ltd., X-52-1139G) was added at 0.1% by weight, regranulated using a twin screw extruder (IKEGAI Corporation, Model PCM 30), and then molded using the above-mentioned injection molder into Izod impact test pieces and 2 mm-thick flat plates for evaluation. The results of such evaluation are shown in Table 3.

Examples 14 and 15

To HIPS-2, silicone composite powder having a volume-average particle diameter of 5 μm (Shin-Etsu Chemical Co., Ltd., X-52-1139K) was added at one of the ratios indicated in Table 4, regranulated using a twin screw extruder (IKEGAI Corporation, Model PCM 30), and then molded using the above-mentioned injection molder into Izod impact test pieces and 2 mm-thick flat plates for evaluation. The results of such evaluation are shown in Table 4.

Example 16

The evaluation was performed according to the same procedure as used in Example 5 with the exception that silicone composite powder is added to HIPS-2. The results are shown in Table 4.

Examples 17–19

To HIPS-3, silicone composite powder having a volume-average particle diameter of 5 μm (Shin-Etsu Chemical Co., Ltd., X-52-1139K) was added at one of the ratios indicated in Table 5, regranulated using a twin screw extruder (IKEGAI Corporation, Model PCM 30), and then molded using the above-mentioned injection molder into Izod impact test pieces and 2 mm-thick flat plates for evaluation. The results of such evaluation are shown in Table 5.

Example 20

The evaluation was performed according to the same procedure as used in Example 5 with the exception that silicone composite powder is added to HIPS-3. The results are shown in Table 5.

Reference Examples 3–5

HIPS-1 to -3 were each regranulated using a twin screw extruder, and molded using an injection molder into Izod impact test pieces and 2 mm-thick flat plates for evaluation. The results of such evaluation are shown in Table 3–5.

TABLE 3

| | | Example | | | | | Reference |
|---|---|---|---|---|---|---|---|
| | | 9 | 10 | 11 | 12 | 13 | 3 |
| Ratio | HIPs - 1 | 99.98 | 99.95 | 99.9 | 99.7 | 99.9 | 100 |
| (parts by | X - 52 - 1139K | 0.02 | 0.05 | 0.1 | 0.3 | — | — |
| weight) | X - 52 - 1139G | — | — | — | — | 0.1 | — |
| Izod impact strength (kgf · cm/cm) | | 10.3 | 12.1 | 10.2 | 10.2 | 10.6 | 7.5 |
| Drop-weight impact strength (kgcm) | | 31.3 | 41.3 | 47.5 | 46.9 | 28.2 | 12.2 |

TABLE 4

| | | Example | | | Reference |
|---|---|---|---|---|---|
| | | 14 | 15 | 16 | 4 |
| Ratio | HIPS - 2 | 99.95 | 99.9 | 99.9 | 100 |
| (parts by | X - 52 - 1139K | 0.05 | 0.1 | — | — |
| weight) | X - 52 - 1139G | — | — | 0.1 | — |
| Izod impact strength (kgf · cm/cm) | | 16.2 | 16.7 | 15.9 | 12.4 |
| Drop-weight impact strength (kgcm) | | 58.4 | 62.8 | 50.5 | 40.0 |

TABLE 5

| | | Example | | | | Reference |
|---|---|---|---|---|---|---|
| | | 17 | 18 | 19 | 20 | 5 |
| Ratio | HIPS - 3 | 99.98 | 99.95 | 99.9 | 99.9 | 100 |
| (parts by | X - 52 - 1139K | 0.02 | 0.05 | 0.1 | — | — |
| weight) | X - 52 - 1139G | — | — | — | 0.1 | — |
| Izod impact strength (kgf · cm/cm) | | 13.5 | 14.1 | 13.2 | 13.9 | 10.5 |
| Drop-weight impact strength (kgcm) | | 40.4 | 52.2 | 56.3 | 37.5 | 29.5 |

Further Examples regarding rubber modified polystyrene are provided below.

Example 21–23

To rubber modified polystyrene resin (Daicel Chemical Industries, Ltd., Daicel styrol R63, Mw=200,000), silicone composite powder having a volume-average particle diameter of 5 μm (Shin-Etsu Chemical Co., Ltd., X-52-1139K, average particle diameter 1–20 μm) was added at one of the ratios indicated in Table 1 (to total 100 parts by weight), regranulated using a twin screw extruder (IKEGAI Corporation, Model PCM 30), and then molded using the above-mentioned injection molder into Izod impact strength test pieces, 2 mm-thick flat plates, tensile strength test pieces, and flexural strength test pieces.

Examples 24–26

To rubber modified polystyrene resin (Daicel Chemical Industries, Ltd., Daicel styrol R63, Mw=200,000), silicone composite powder having a volume-average particle diameter of 13 m (Shin-Etsu Chemical Co., Ltd., X-52-1139G, average particle diameter 1–30 μm) was added at one of the ratios indicated in Table 2 (to total 100 parts by weight), regranulated using a twin screw extruder (IKEGAI Corporation, Model PCM 30), and then molded using the above-mentioned injection molder into Izod impact strength test pieces, 2 mm-thick flat plates, tensile strength test pieces, and flexural strength test pieces.

Reference Example 6

Rubber modified polystyrene resin (Daicel Chemical Industries, Ltd., Daicel styrol R63, Mw=200,000) was granulated using a twin screw extruder (IKEGAI Corporation, Model PCM 30), and molded using the above-mentioned injection molder into Izod impact strength test pieces, 2 mm-thick flat plates, tensile strength test pieces, and flexural strength test pieces.

Reference Example 7

To rubber modified polystyrene resin (Daicel Chemical Industries, Ltd., Daicel styrol R63, Mw=200,000), silicone oil (Shin-Etsu Silicone Co., Ltd., KF-96 1000CS) was added in an amount of 1.2 parts by weight (to total 100 parts by weight), regranulated using a twin screw extruder (IKEGAI Corporation, Model PCM 30), and then molded using the above-mentioned injection molder into Izod impact strength test pieces, 2 mm-thick flat plates, tensile strength test pieces, and flexural strength test pieces.

The test pieces thus prepared were each subjected to the above-described physical tests. The results are summarized in Table 6.

TABLE 6

|  |  |  | Reference |  | Example |  |  |  |  |  |
|---|---|---|---|---|---|---|---|---|---|---|
|  |  |  | 6 | 7 | 21 | 22 | 23 | 24 | 25 | 26 |
| Additives | Weight of X - 52 - 1139K added | parts by weight | 0 | 0 | 0.1 | 0.5 | 1.0 | — | — | — |
|  | Weight of X - 52 - 1139G added | parts by weight | 0 | 0 | — | — | — | 0.1 | 0.5 | 1.0 |
|  | Weight of KF-96 added | parts by weight | 0 | 1.2 | — | — | — | — | — | — |
| Practical physical properties | Dynamic coefficient of friction | — | 0.41 | 0.37 | 0.37 | 0.36 | 0.34 | 0.36 | 0.35 | 0.33 |
|  | Static coefficient of friction | — | 0.43 | 0.38 | 0.39 | 0.38 | 0.36 | 0.38 | 0.37 | 0.35 |
|  | Dynamic coefficient of friction after wiping | — | 0.43 | 0.41 | 0.38 | 0.36 | 0.35 | 0.36 | 0.35 | 0.34 |
|  | Static coefficient of friction after wiping | — | 0.43 | 0.42 | 0.39 | 0.38 | 0.37 | 0.37 | 0.38 | 0.35 |
|  | Flexural modulus | (Kg/cm$^2$) | 30,800 | 19,900 | 30,700 | 31,300 | 31,200 | 30,400 | 30,500 | 31,200 |
|  | Tensile strength | (Kg/cm$^2$) | 470 | 243 | 490 | 500 | 500 | 520 | 515 | 505 |
|  | Izod impact strength unnotched | (kgf. cm/cm) | 5.6 | 6.0 | 7.5 | 9.0 | 10.0 | 7.0 | 9.0 | 10.0 |

Based on the results in Table 6, the compositions of Examples 21–26 are superior in sliding properties to the usual rubber modified polystyrene-based resins or silicone oil-added resins, and they also exhibit remarkable permanence.

EFFECTS OF THE INVENTION

According to the present invention, one can obtain styrene-based resin compositions remarkably improved in impact resistance and sliding properties, particularly in permanence during sliding. In particular, when the base material is transparent polystyrene-based resin, it was found that the present invention can provide styrene-based resin compositions having excellent impact strength, sliding properties, and transparency without spoiling their fluidity and thermostability. In addition, use of rubber modified polystyrene as styrene-based resin permits styrene-based resin compositions exhibiting well-balanced impact resistance, sliding properties, heat distortion resistance, molding properties, workability, and surface appearance of molded articles. Thus, the present invention enables general-purpose styrene-based rigid thermoplastics to be used for various applications, that is, it allows improvement of such thermoplastics particularly in adaptability to injection molding, extrusion molding and the like, and thereby will contributes to extension of the range of their application.

What is claimed is:

1. A styrene-based resin composition in which 0.0001–3 parts by weight of silicone powder is blended with 100 parts by weight of styrene-based resin.

2. A styrene-based resin composition of claim 1 in which the silicone powder has a composite structure consisting essentially of silicone rubber fine particles of which surface is coated with silicone resin.

3. A styrene-based resin composition of claim 1 in which the silicone powder has a volume-average particle diameter of 0.1–25µ.

4. A styrene-based resin composition of claim 1 in which the silicone powder is a silicone rubber powder consisting essentially of an addition polymer of vinyl-containing organopolysiloxane and organohydrogen polysiloxane.

5. A styrene-based resin composition of claim 4 in which the silicone powder is a silicone rubber powder consisting essentially of an addition polymer of vinyl-containing dimethyl polysiloxane and methyl hydrogen polysiloxane.

6. A styrene-based resin composition of claim 1 wherein the siloxane backbone chain in the silicone powder is cross-linked in the form of a three-dimensional network.

7. A styrene-based resin composition of claim 1 in which the silicone powder is a silicone rubber powder consisting essentially of an addition polymer of vinyl-containing organopolysiloxane and organohydrogen polysiloxane of which a particle surface is coated with polydimethylsilsesquioxane.

8. A styrene-based resin composition of claim 1 wherein the styrene-based resin is substantially transparent.

9. A styrene-based resin composition of claim 1 in which the styrene-based resin is polystyrene having a weight-average molecular weight of $10 \times 10^4$–$60 \times 10^4$.

10. A styrene-based resin composition of claim 1 wherein the styrene-based resin is rubber-modified polystyrene.

11. A styrene-based resin composition of claim 1 wherein the rubber modified styrene-based resin is rubber-modified polystyrene which contains 1–30% by weight dispersed rubber particles having a volume-average particle diameter of 0.01–5 µm.

12. A styrene-based resin composition of claim 1 wherein said composition has a dynamic coefficient of friction of 0.3–0.4 and a static coefficient of friction of 0.3–0.4 each as measured in conformity with JIS-K7125-1987.

13. A molded article produced from a styrene-based resin composition of claim 1.

14. An injection-molded article produced from a styrene-based resin composition of claim 1.

15. An extruded article produced from a styrene-based resin composition of claim 1.

16. A styrene-based resin composition consisting essentially of about 0.00001 to 3 parts by weight of silicone powder per about 100 parts by weight of styrene-based resin, the silicone powder having a composite structure consisting essentially of silicone rubber fine particles a surface of which is coated with silicone resin, and the silicone powder further having a volume-average particle diameter in the range of about 0.1 μm to about 25 μm.

17. The styrene-based resin composition as recited in claim 16, wherein the silicone powder is a silicone rubber powder consisting essentially of an addition polymer of vinyl-containing dimethyl polysiloxane and methyl hydrogen polysiloxane.

18. The styrene-based resin composition as recited in claim 16, wherein the silicone powder is a silicone rubber powder primarily consisting of an addition polymer of vinyl-containing organopolysiloxane and oganohydrogen polysiloxane.

19. The styrene-based resin composition as recited in claim 18, wherein the siloxane backbone chain in the silicone powder is cross-linked in the form of a three-dimensional network.

20. The styrene-based resin composition as recited in claim 18, wherein the particle surface is coated with polydimethylsilsesquioxane.

21. The styrene-based resin composition as recited in claim 16, wherein the styrene-based resin is polystyrene having a weight-average molecular weight of about $10 \times 10^4$ to about $60 \times 10^4$.

22. The styrene-based resin composition as recited in claim 16, wherein the styrene-based resin is rubber-modified polystyrene.

23. The styrene-based resin composition as recited in claim 22, wherein the rubber-modified polysterene contains in the range of about 1% to about 30% by weight dispersed rubber particles having a volume-average particle diameter in the range of about 0.01 μm to about 5 μm.

24. The styrene-based resin composition as recited in claim 16, the styrene based composition having a dynamic coefficient of friction in the range of about 0.3 to about 0.4 and a static coefficient of friction in the range of about 0.3 to about 0.4, each as measured in conformity with JIS-K7125-1987.

* * * * *